May 2, 1944.  R. J. MILLER  2,348,086

METHOD OF MAKING PATTERNS

Filed Dec. 1, 1941  5 Sheets-Sheet 1

INVENTOR.
RAYMOND J. MILLER
BY
ATTORNEY

May 2, 1944.  R. J. MILLER  2,348,086
METHOD OF MAKING PATTERNS
Filed Dec. 1, 1941  5 Sheets-Sheet 3

INVENTOR.
RAYMOND J. MILLER
BY
*A. E. Wilson*
ATTORNEY

May 2, 1944.  R. J. MILLER  2,348,086
METHOD OF MAKING PATTERNS
Filed Dec. 1, 1941   5 Sheets-Sheet 4

INVENTOR.
RAYMOND J. MILLER
BY
A. C. Wilson
ATTORNEY

Patented May 2, 1944

2,348,086

UNITED STATES PATENT OFFICE 2,348,086

METHOD OF MAKING PATTERNS

Raymond J. Miller, Detroit, Mich., assignor, by direct and mesne assignments, to Miller Engineering Corporation, Detroit, Mich., a corporation of Michigan Application December 1, 1941, Serial No. 421,115

12 Claims. (Cl. 22—157)

This invention relates to the art of casting, and more particularly to the making of patterns for reproducing articles having unsymmetrical contours and for making matched patterns where no well defined straight parting line is available on the article to be reproduced.

Heretofore in the formation of patterns for reproducing unsymmetrical articles, or in the formation of matched patterns for reproducing articles where no well defined straight parting line is available, the following three methods have been employed:

(1) The formation of a master wood pattern having double shrinkage allowance employed in the formation of a brass, aluminum or other production pattern having single shrinkage allowance; (2) the use of a master wood pattern having single shrinkage allowance employed in the formation of a production pattern in white metal having single shrinkage allowance. White metal is objectionable for use as production patterns because it is too heavy; and (3) the use of a master wood pattern having double shrinkage allowance employed to form a desired number of white metal patterns also having double shrinkage allowance. These white metal patterns are mounted on a plate and are used in the formation of production aluminum, brass or other suitable patterns having single shrinkage.

All of these methods of forming production patterns are objectionable because a great deal of hand and machine work are necessary to accurately finish the pattern to the shape and contour of the original master wood pattern.

In the casing of articles having irregular shapes or contours where no well defined straight parting line is available, it is customary to provide matched patterns wherein a portion of the contours of the article to be cast appears on separate patterns. These patterns may be accurately aligned on opposite sides of a horizontally disposed plate to position vertically spaced portions of the compound pattern in the cope and drag portions of the mold.

Heretofore in the formation of matched patterns it has been customary to form the matched pattern segments separately. Great difficulty has been experienced in aligning the vertically spaced segments of the pattern with a sufficient degree of accuracy to produce good castings.

By the use of my improved process I eliminate the necessity for the hand and machine work heretofore required in the formation of matched patterns and provide pattern segments which may be readily aligned to accurately conform to the shape and contour of the master pattern.

In carrying out this improved process the master wood pattern having allowance for single shrinkage is positioned on any suitable surface and is built up with a moldable material to provide on the pattern a suitable parting to eliminate back draft.

A substance possessing the characteristics of flowing and solidifying under substantially constant volume conditions which are not injurious to the master wood pattern is then applied directly to the master wood pattern and the parting material to form a female impression of a portion of the master model. Suitable dowels or locators are positioned outside of the parting material to reproduce themselves in the female impression to facilitate accurate alignment of the pattern sections formed therefrom.

After solidification of the applied material the unit is inverted, the parting material and dowels or locators removed, and a substance possessing similar characteristics which will not fuse with the initially applied substance is applied to the exposed surface of the master wood model to form a female impression of the remainder of the master wood model. The locators or dowels will be reproduced on this female impression as male dowels. A plurality of vertically spaced female matched recipients each having a portion of the contour of the master wood pattern are thus provided.

These matched female recipients are then separated and the master wood pattern removed. Another substance possessing the characteristics of flowing and solidifying under non-fusing conditions with the material of which the female recipients are formed is then applied to the female recipients to form male matched plate patterns accurately conforming to the shape and contour of the original master wood model, and having cooperating male and female locators positioned therein.

These matched male patterns may then be applied to a plate and employed as matched plate patterns in the formation of castings, or they may be used separately in the cope and drag sections of the mold to form castings.

Where it is desired to cast articles of a substance which does not shrink upon solidification or where some extraneous means are provided to eliminate the effects of shrinkage, the master wood model will be initially formed with no shrink.

The pattern may be provided with core prints and their respective impressions will be carried over by the first conveyance material into the final production pattern so that it will be possible to locate cores of any desirable material within the final mold. It is also possible to reproduce the so-called "stripper" patterns by this same method, eliminating the tedious job of integrating the pattern with the stripper plate.

An object of this invention resides in the formation of production patterns accurately conforming to the shape and contour of a master wood model by a reproduction process in substances possessing the characteristics of flowing and solidifying under temperature and pressure conditions which are not injurious to the master wood model.

Another object of the invention is to provide matched patterns having built up partings to eliminate back draft.

A further object of the invention is to provide a method whereby an intricately contoured article may be readily and economically reproduced in a substance which may be directly applied to the surface of the article to be reproduced.

Still another object is to provide an improved method of producing matched patterns by a reproduction process wherein the master wood model is employed as a mold for the production of the matched patterns.

A further object is to provide an improved process whereby matched plate or simple plate patterns of symmetrical or unsymmetrical articles can be quickly and economically formed.

A further object is to provide an improved process whereby patterns having coaxial portions may be readily and accurately formed to reproduce the shape and contour of a master wood model with a high degree of fidelity.

Another object of this invention resides in the provision of locators positioned outside of the parting of a pattern whereby the cooperating matched portions of the pattern whether it be a matched plate pattern or a simple plate pattern, may be accurately aligned with its cooperating segment.

Yet a further object of the invention resides in the provision of a method whereby stripper plate production patterns or patterns which employ follow boards can be readily and economically formed.

A further object is to provide a simplified means of producing production patterns for articles having long unsupported surfaces where deep draws are required.

Still a further object resides in the provision of an improved method of forming patterns whereby the shape of cores and stripper plates may be reproduced in the final pattern.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
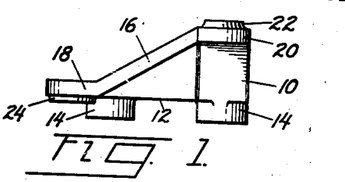
Fig. 1 is a front elevational view of a master wood model or casting of a typical article to be reproduced.
Figure 2:
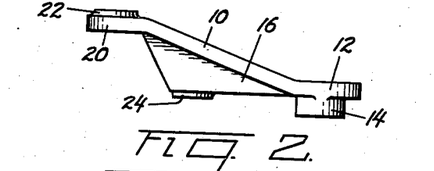
Fig. 2 is a side elevation of the article illustrated in Fig. 1.
Figure 3:
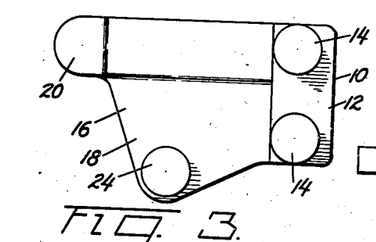
Fig. 3 is a bottom view of the same article.
Figure 4:
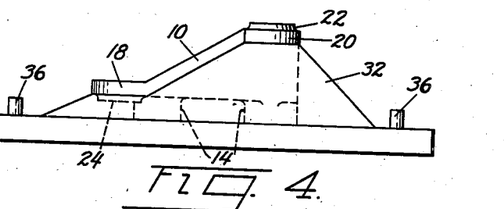
Fig. 4 is a front elevation of the master pattern illustrated as being positioned on a plate and having parting material applied to it to eliminate back draft.

Figs. 1, 2 and 3 are illustrative of a master wood pattern 10 of a typical article which it may be desired to reproduce. Attention is called to the fact that the article to be reproduced may be unsymmetrical and may embody virtually any desired contour. It is not necessary that a well defined straight parting line be available on the article.

The article 10 illustrated in Figs. 1 to 3, may for example have a substantially flat horizontal portion 12 having a pair of downwardly projecting bosses 14 and a double angularly inclined portion 16 terminating in a substantially flat portion 18 having a downwardly directed boss 24. The angularly inclined portion 16 may terminate in a substantially flat portion 20 having an upwardly directed boss 22.

In the formation of production patterns for the typical unsymmetrical article illustrated in Figs. 1 to 3, the master wood pattern 10 is positioned on a plate 30. Any suitable parting material 32 such for example as modeling clay or dental plaster is packed around the elevated portions of the master pattern 10 in such a manner as to eliminate back draft in the exposed and unexposed portions of the pattern. After the parting material has been applied a frame 34 of any suitable shape is positioned on the plate 30 to surround the pattern 10 and the parting material 32. A pair of locators 36 formed of any suitable material may be positioned on the plate 30 outside of the parting material 32 and within the confines of the frame 34.

Figure 5:
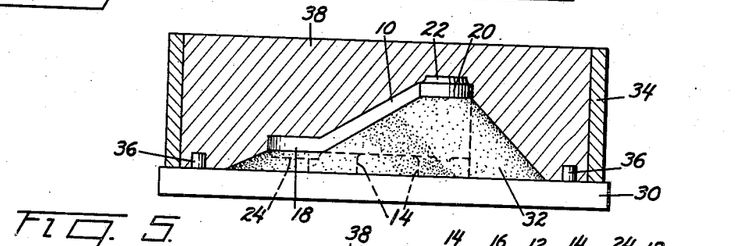
Fig. 5 is a schematic view illustrating the next step in the formation of production patterns wherein a substantially constant volume material possessing the characteristics of flowing and solidifying under conditions not injurious to the master wood pattern is applied thereto to form a female impression of the exposed portion of the master pattern.

A substance 38 such for example as Woods metal alloys or any suitable substantially constant volume material possessing the characteristics of flowing and hardening under temperature and pressure conditions which are not injurious to the surface of the master wood model 10 may be poured into the space within the frame 34 to completely fill the space between the frame and the pattern 10 and parting material 32 to form a female impression 40 of the exposed portion of the pattern 10.

It will be understood that the master pattern 10 need not be made of wood since any material suitable for patterns can be employed, or a casting may be used in lieu of a pattern. Where wood is employed, the alloy or substance 38 should have a pouring temperature not higher than the charring temperature of the wood employed in the master pattern 10. The majority of woods normally used for patterns such for example as mahogany and pine have a charring temperature of approximately 380° F., and an igniting temperature of approximately 488° F. The substance 38 of which the female impression 40 is formed should therefore possess the characteristic of flowing at a temperature somewhat less than 380° F.

Suitable materials in addition to the various Woods metal alloys which have negligible contraction upon solidification are "Cerromatrix" which has a pouring temperature of approximately 350° F.; "Cerrobase" having a pouring temperature of approximately 310° F., and "Cerrobend" having a pouring temperature of approximately 160° F. It will be understood that the substance employed may be a plastic, either of the thermoplastic or thermosetting type having negligible variation of volume upon hardening.

Where the master pattern 10 being reproduced is formed of metal, the substance 38 of which the impression 40 is formed may be likewise formed of metal having pouring temperatures somewhat less than the melting temperature of the material of which the pattern or model being reproduced is made. If a metal is employed instead of an alloy or plastic or other suitable substance, the metal should not shrink appreciably, or the shrinkage of the metal should be compensated in the size of the original pattern or article which it is desired to reproduce.

The substance 38 should also be non-fusable with the parting material 32 and the material of which the master pattern 10 is formed. If desired, suitable parting substances or compounds can be employed to prevent fusion of the substance 38 to the surface of the master pattern 10 and material used as the parting 32.

Figures 6, 7:
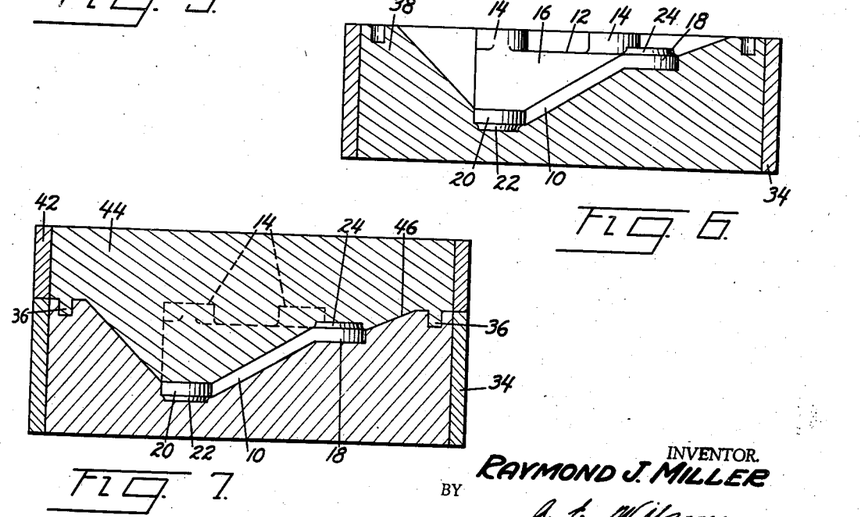
Fig. 6 is a schematic view illustrating the next step in the formation of production patterns wherein the element of Fig. 5 is inverted and the parting material applied in the step illustrated in Fig. 4 is removed, allowing the exposed portion of the pattern to project above the material applied in the step illustrated in Fig. 5.
Fig. 7 is a view similar to Fig. 6 illustrating the next step in the formation of production patterns wherein another substantially constant volume material possessing the properties of not injuring the master pattern is applied to the exposed portion of the master wood pattern and the material applied in the step illustrated in Fig. 5 to form a reciprocal female impression of the remainder of the master pattern.

After the step indicated in Fig. 5 has been performed and the material 38 has solidified, the block with the frame 34 should be inverted as illustrated in Fig. 6 and the parting material 32 removed.

As illustrated in Fig. 7, another frame 42 may be positioned above the frame 34 and other material 44 possessing the characteristics of not fusing with the material 38 and not injuring the surface of the pattern 10 is poured into the frame 42 to form a reciprocal female impression 46 of the exposed portion of the master pattern 10.

If desired, the material 44 may be the same as the material 38. Where low melting alloy is employed its temperature will not be sufficiently high to cause the solidified material 38 to soften to a point that the materials 44 and 38 will fuse, and moreover the material 38 will impart a chill to the material 44. Suitable parting substances or powders may be employed to guard against fusing of the materials 38 and 44 of which the reciprocal female impressions 40 and 46 are formed if the mass of the material 44 is large compared with that of the material 38, or if for any other reason there is a possibility of the materials fusing.

Figure 10:
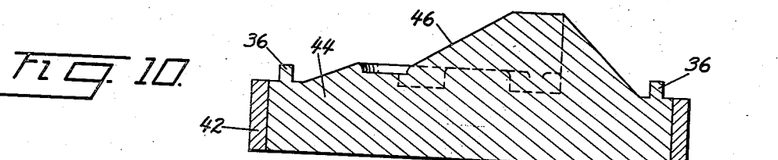
Figs. 10 and 11 are views similar to Figs. 3 and 9 showing the similar steps performed on the female impression formed in the step illustrated in Fig. 7 to form the matching male imprint to cooperate with the male imprint formed in Fig. 9.
Figure 11:
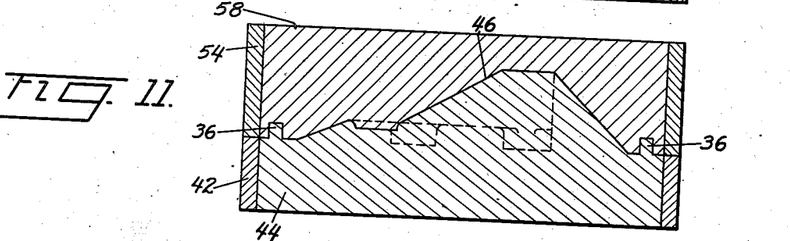
Figures 12, 13:
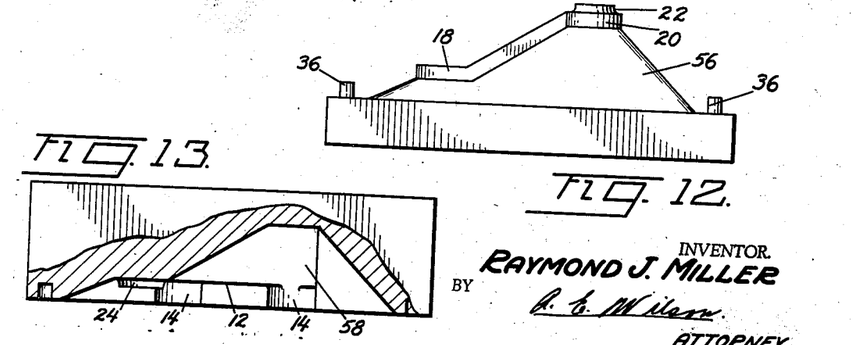
Figs. 12 and 13 are front elevational views partly in section of the production patterns formed in the steps illustrated, shown in the positions to be applied to the cope and drag sections respectively of a matched pattern plate.

Upon solidification of the substance 44 the frame 42 with the material 44 in place therein is removed and is inverted as illustrated in Fig. 10. The master pattern 10 is then removed from the material 38 as illustrated in Fig. 8.

Figure 8:
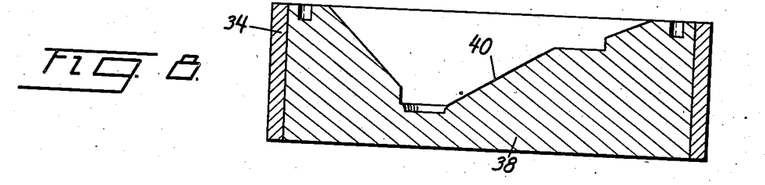
Fig. 8 is a view similar to Fig. 6 illustrating the next step wherein the female impressions of the master pattern are separated with the master wood pattern removed, and showing the female impression formed in the step illustrated in Fig. 5.
Figure 9:
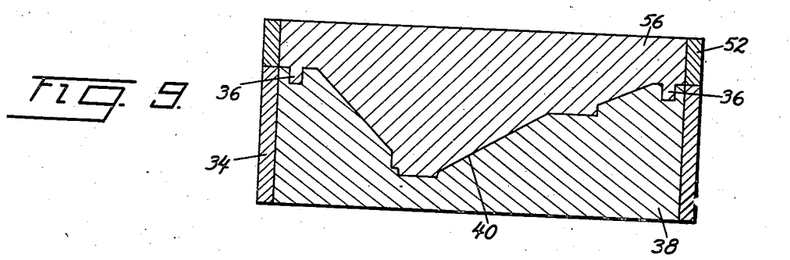
Fig. 9 illustrates the next step wherein a male imprint is formed from the female impression illustrated in Fig. 8 by applying thereto a substance possessing the characteristics of not fusing with the material of which the female impression is formed.

The materials 38 and 44 have the female impressions 40 and 46 of vertically spaced portions of the master wood pattern 10 as illustrated in Figs. 8 and 10.

Male production patterns 48 and 50 may then be formed from the female impressions 40 and 46 respectively of Figs. 8 and 10 by applying above each of the frames 34 and 42 a vertically spaced frame 52 and 54 respectively and applying to the material 38 and 44 of Figs. 8 and 10 respectively a substance 56 and 58 possessing the characteristic of not fusing with the material 38 and 44 having the female impressions 40 and 46 formed therein to form the production male patterns 56 and 58. Suitable means similar to those discussed above may be provided to prevent the materials 56 and 58 from fusing with the materials 38 and 44 having the female impressions 40 and 46 formed therein.

The matched production patterns 56 and 58 thus formed accurately conform to the shape and contour of the original master pattern 10 and are the same as to size and contour because of the fact that the material employed in their formation does not expand or contract appreciably upon solidification.

Figure 14:
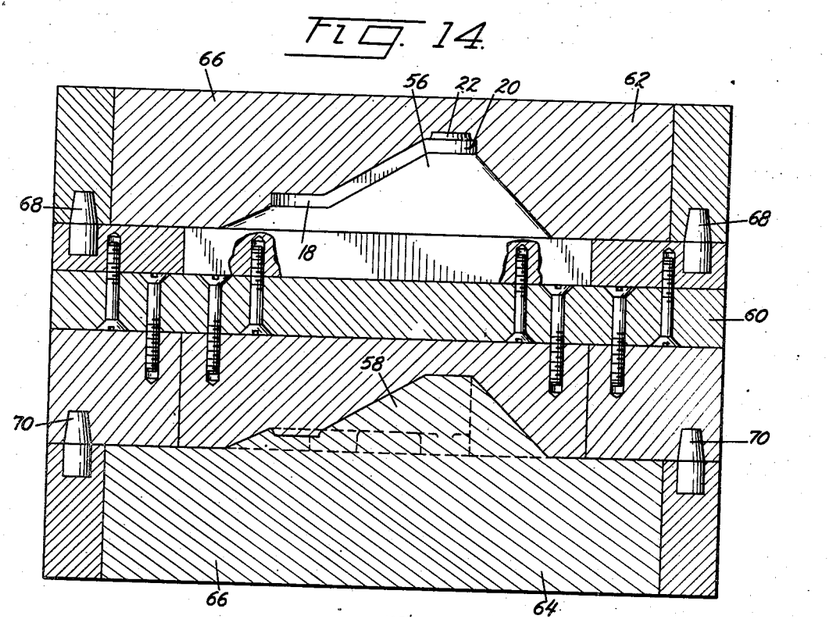
Fig. 14 is a cross sectional view of the matched plate pattern in place with the flask containing the molding material.

After the male patterns 56 and 58 have been formed they may be fastened on opposite sides of a plate 60 and used as a production matched plate pattern as illustrated in Fig. 14.

Figure 15:
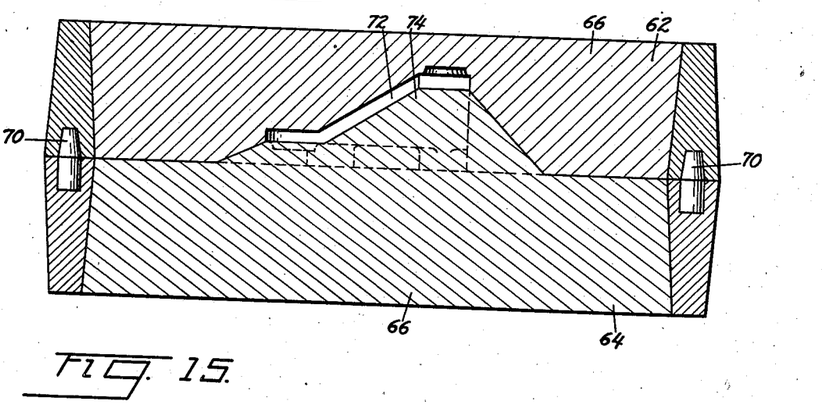
Fig. 15 is a cross sectional view of the flask with the pattern removed and the molding material in place ready for pouring the material to form the casting.

The pattern 56 projects into the cope portion 62 of the molding material in the flask, and the pattern 58 projects into the drag portion 64 of the molding material in the flask. Suitable molding material such for example as sand, gypsum, etc., may be rammed into the cope and drag portions to take the impression of the patterns 56 and 58. Suitable dowel pins or locators 68 and 70 may be provided to locate the cope and drag portions of the flask relative to the plate 60 to accurately align the impressions 72 and 74 of the patterns 56 and 58 coaxially with each other. After the molding material has been applied and set, the cope and drag portions are separated and the plate 60 having the patterns 56 and 58 thereon is removed. The cope portion 62 is then applied to the drag portion 64 as illustrated in Fig. 15 and aligned by the dowel pins 70 of the flask. Metal or other moldable material may then be poured into the flask to produce the castings.

Figure 16:
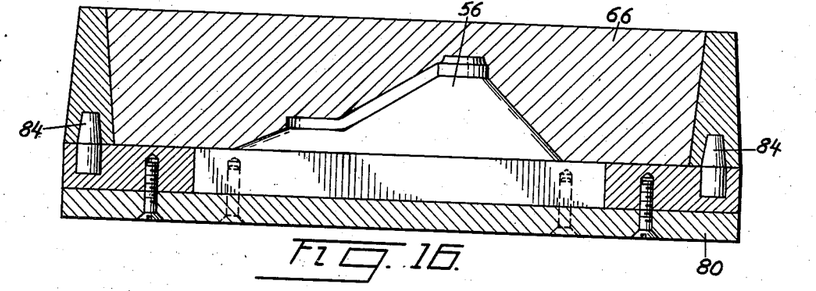
Figs. 16 and 17 are cross sectional views of matched plates showing the patterns in place with the cope and drag portions of the flask containing the molding material, and showing an alternative form of molding.
Figure 17:
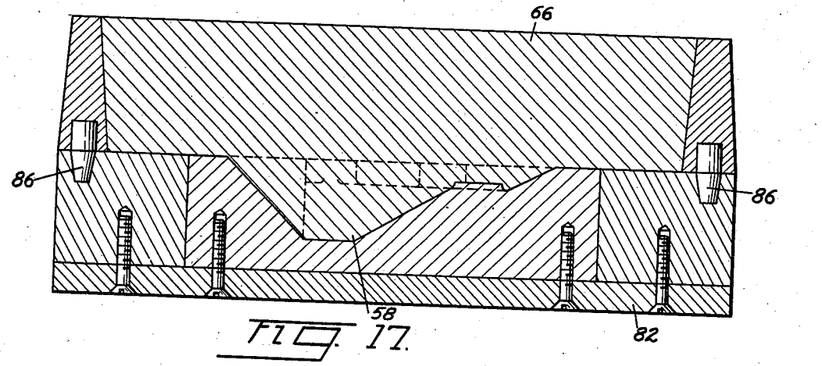

The male patterns 56 and 58 can also be used as single plate patterns as illustrated in Figs. 16 and 17. Where this method of casting is employed, each of the patterns 56 and 58 is secured to a plate 80 and 82 respectively located relative to the cope and drag portions of the flask by means of dowels or other suitable locators 84 and 86 respectively which are provided in each of the cope and drag portions of the flask. The molding material 66 is then applied to the cope and drag portions of the flask. When the molding material has set, the cope and drag portions having the mold impressions 72 and 74 therein may be assembled as illustrated in Fig. 15 and the castings formed by pouring into the flask the moldable material.

The male and female segments of the pattern are accurately aligned with each other by the locators 36 positioned on the plate 30 outside of the parting material 32 to form female impressions in the material 38 applied in the step illustrated in Fig. 5. When the material 44 is applied to the material 38 in the step illustrated in Fig. 7 to form the complementary female impression 46 in the material 44, the imprint of the locators 36 will be formed therein as male locators as illustrated, positioned outside of the parting 32.

In order to secure this matching of pattern portions in the ordinary processes heretofore used, it is necessary to take extraordinary precautions that the pattern section located on the upper or cope portion of the plate registers accurately coaxially and vertically with the companion pattern portion of the lower or drag portion of the plate.

In the methods heretofore used this matching process was very elaborate, time consuming and costly, and it was necessary that every portion of the pattern be checked and gauged as to height and disposition in relation to its companion pattern section on the other side of the plate or with a complementary plate.

In the use of my improved process these disadvantages are eliminated because the primary locators cast into the first female impression of the pattern are transferred to the reciprocal female impression and also to the male imprints of the female impressions. It is therefore possible to secure the two pattern halves together and finish off the external portions of the patterns irregardless of the contour of the pattern sections. In locating the male pattern sections upon the plate or on their respective plates, it is only necessary to align the outside of the pattern with two lines on the plate extending at right angles to each other. This readily provides automatic alignment of the two male component parts of the pattern.

Great difficulty has heretofore been experienced in the formation of production stripper plate patterns or patterns which employ follow boards. These types of patterns are desirable to facilitate removal of the production pattern from the molding material where long unsupported draws are necessary, such for example as in the formation of production patterns for making cylinders of aircraft engines having long relatively closely spaced radially extending cooling fins. These type of patterns can be readily formed by my new process.

The embodiment of the invention illustrated in Figs. 18 to 24 is similar in many respects to that illustrated in Figs. 1 to 17. Corresponding reference numerals have therefore been applied insofar as possible with the addition of 100.

Figure 18:
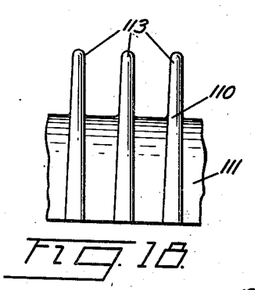
Fig. 18 is a side view of a master pattern embodying a narrow deep draw.

Fig. 18 illustrates a master wood pattern 110 for an airplane engine cylinder or any article having a deep narrow draw. The pattern 110 is one portion of a split pattern and has a cylindrical portion 111 and a plurality of radially extending relatively closely spaced fins 113 fixed thereto.

Figure 19:
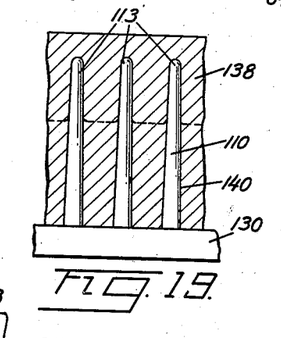
Fig. 19 is a part sectional view showing the step corresponding to Fig. 5 wherein the material forming the female imprint is applied.

In Fig. 19 the pattern 110 has been positioned on the plate 130 and the substance 138 poured into the space between a suitable frame and the surface of the master wood pattern 110 to form the female impression 140 accurately conforming to the shape and contour of the master wood pattern 110. It will be recalled that the material 138 can be any substance possessing the characteristics of maintaining substantially constant volume, and which does not injure the surface of the master model 110.

Figure 20:
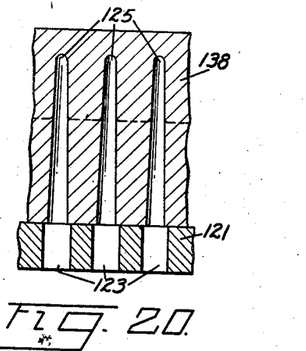
Fig. 20 is a part sectional view with the master pattern removed and showing a stripper plate in place.
Figure 21:
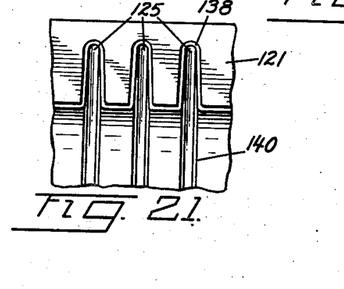
Fig. 21 is a bottom view taken substantially on the line 21—21 of Fig. 20.

When the material 138 has solidified, the master pattern 110 may be removed and a stripper plate 121 having apertures or cut-out portions 123 aligned with the cavities 125 for the fins 113 is positioned in engagement with the inner contour of the material 138 forming the female impression 140 as illustrated in Fig. 20.

Figure 22:
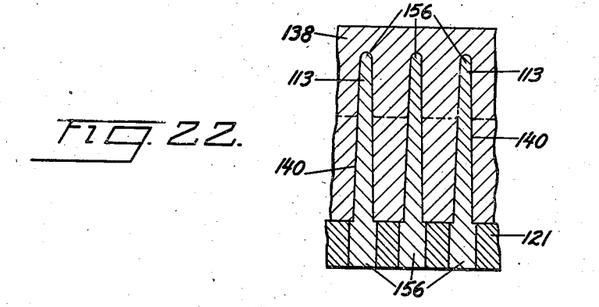
Fig. 22 is a cross sectional view showing the step corresponding with that illustrated in Figs. 9 and 11 wherein the production pattern is formed from the female impression with the stripper plate in place.

The material 138 with the stripper plate 121 in place is then inverted and material 156 is poured into the female impression 140. The material 156 fills the cavities 125 for the fins 113, the space 127 corresponding to the contour of the cylindrical portion 111 of the pattern, and the apertures 123 in the stripper plate 121 as illustrated in Fig. 22 to form a male production pattern. Referring to the discussion of the step illustrated in Fig. 9, it will be recalled that the material 156 should possess the characteristic of not fusing with the material 138 of which the female impression 140 is formed.

Figure 23:
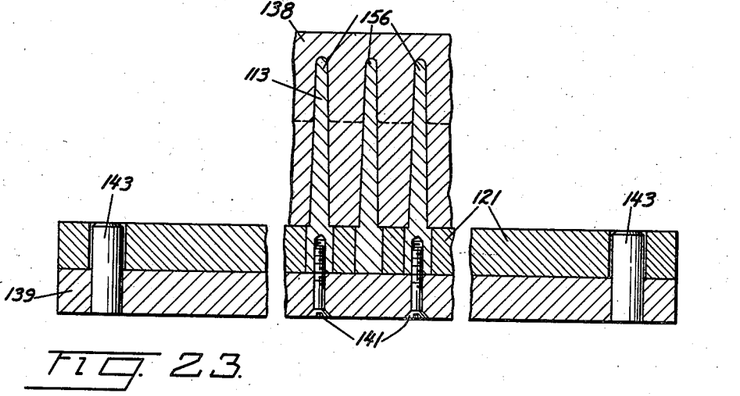
Fig. 23 is a sectional view illustrating the step of applying the stripper backing plate to the production stripper pattern with the dowel or locating pins in place.

When the material 156 forming the male production pattern has set, a stripper backing and withdrawal plate 139 may be attached thereto by any suitable means as by the screws 141 as illustrated in Fig. 23. Suitable locators or guide fins 143 may be provided between the withdrawal plate 139 and the stripper plate 121 to guide the withdrawal plate and the master pattern 156 as it is withdrawn from the material 138 forming the female impression 140.

Figure 24:
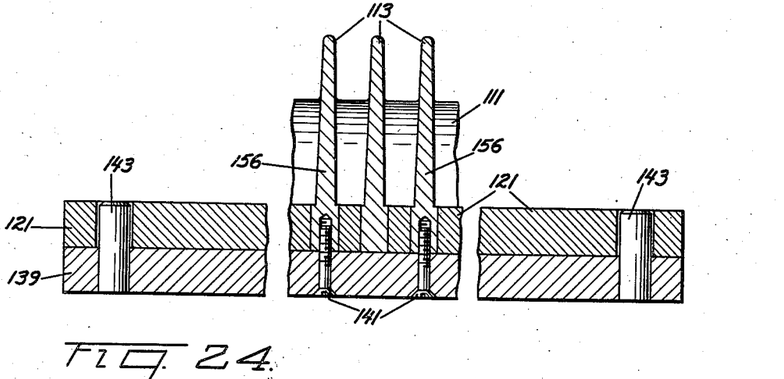
Fig. 24 is a sectional view illustrating the complete stripper pattern removed from the female impression.

The complete production pattern with stripper and withdrawal plates applied is illustrated in Fig. 24. To use this pattern in the making of castings, the pattern as illustrated in Fig. 24 is positioned in a flask and rammed up with molding material. A plate is positioned on top of the flask to hold the sand in place, and the flask is inverted. The withdrawal plate 139 having the production pattern 156 is then carefully withdrawn from the molding material in the flask, the guide fins 143 guiding the movement of the withdrawal plate through the stripper plate. The stripper plate acts to hold the molding material in place in the flask as the pattern is withdrawn. The stripper plate may then be removed and the flask is ready to be assembled with its other portions and the castings may then be poured.

It is not necessary that the parting line on the stripper plate be straight because with my novel process the stripper plate can be contoured to accommodate irregularities in the pattern being reproduced.

To summarize briefly, to form a stripper plate pattern or a pattern that employs a follow board, a conventional split master pattern may be used. A female impression is made directly off of the master pattern. After the female impression has been removed from the pattern the stripper plate to be employed with the final equipment is placed upon the open surface of the female impression mold. The stripper slots do not have to align accurately with their component part as is necessary in the usual practice, but only need to comply with them roughly, with attention being paid that they are larger than the conjunctional parts of the pattern to be made. With this plate secured in place, the molten material of which the production pattern is to be formed is poured into the female receptacle and stripper plate so that it can be machined flush with the back of the plate. The production pattern is then mounted on its withdrawal plate with the withdrawal guide fins in place in the stripper plate. Thus we have a stripper pattern.

In the case where a core is required to produce the desired casting, the necessary core print may be provided on the master pattern so that its impression will be carried throughout the steps to the final production pattern to provide the recipient for the core. With this improved process, hanging cores can be readily supported, without the use of chaplets to secure the desired metal thickness. In ordinary practice as heretofore used, it is virtually impossible to support hanging cores so that it is possible to core simultaneously from both sides of the mold without the laborous process of pasting cores or suspending them by extraneous means from the outside.

I claim:

1. The method of making matched plate patterns from a master wood pattern which comprises positioning the master wood pattern on a plate, applying parting material to the master pattern to eliminate back draft, positioning a frame around the pattern and parting material, applying to the exposed surface of the pattern and parting a material capable of flowing and hardening under conditions which are not injurious to the surface of the master pattern to form a female impression of a portion of the master pattern, inverting said material and master pattern, removing the parting material, applying to the exposed surface of the pattern a material capable of flowing and hardening under conditions which are not injurious to the surface of the master pattern to form a female impression of the remainder of the master pattern, separating said female impressions, and applying to each a non-fusable material capable of flowing and hardening under conditions which are not injurious to said female impressions to form male matched plate production patterns.

2. The method of making patterns for casting irregular shaped articles which comprises applying to a wood model of said article a parting material to eliminate back draft, applying to the exposed surface of the wood model an alloy having such low pouring temperature as to not injure the exposed surface of the wood model to form a female impression of a portion of the wood model, inverting the alloy and model and applying to the surface of the wood model initially covered by the parting material an alloy having such low pouring temperature as to not injure the exposed surface of the wood model or fuse with the first mentioned alloy to form a female impression of another portion of the wood model, separating said female impressions and applying to each a substance having the characteristics of filling said female impressions and solidifying to form male patterns accurately conforming to the shape and contour of the wood model.

3. The method of making patterns from a master model which comprises applying parting to the master model to eliminate back draft, applying to the exposed surface of the model and parting a substance capable of solidifying under conditions which are not injurious to the surface of the master model to form a female impression of a portion of the master model, inverting said material and master model, removing the parting, applying to the exposed surface of the model a substance capable of solidifying under conditions which are not injurious to the surface of the master model to form a female impression of the remainder of the master model, separating said female impressions, and applying to each a non-fusable substance capable of solidifying under conditions which are not injurious to said female impressions to form male patterns.

4. The method of making patterns which comprises applying to a model a parting substance to divide the model into a plurality of mold sections, applying to the exposed surface of the model an alloy of the Woods metal group having such low pouring temperature as to not injure the exposed surface of the wood model to form a female impression of a portion of the model, inverting the alloy and model and applying to the surface of the model initially covered by the parting material an alloy of the Woods metal group having such low pouring temperature as to not injure the exposed surface of wood model or fuse with the first mentioned alloy to form a female impression of another portion of the model, separating said female impressions and applying to each a substance having the characteristics of filling said female impressions and solidifying therein without fusing with said alloy to form male patterns accurately conforming to the shape and contour of the model.

5. A stripper plate production pattern for use in casting an article having a deep draw comprising a cast male imprint of a stripper plate and a female impression of the article to be reproduced.

6. The method of making a production stripper plate pattern from a master wood pattern having a deep draw which comprises forming a female impression of the master wood pattern in a substance possessing the characteristic of hardening under conditions which are not injurious to the surface of the master wood pattern, removing the master pattern from the female impression, positioning a stripper plate adjacent the female impression, and thereafter forming the production stripper plate pattern by casting into the female impression and stripper plate a substantially constant volume material possessing the characteristic of not fusing with the female impression or stripper plate.

7. The method of making stripper plate patterns from a master model which comprises applying parting material to the surface of the master model to eliminate back draft and to form vertically spaced sections, casting female impressions of said vertically spaced sections, applying stripper plates to the female impressions, and casting male matched plate patterns from said female impressions and stripper plates.

8. The method of making production patterns from a master wood pattern which comprises positioning the master wood pattern on a supporting surface, applying parting material to the master pattern to eliminate back draft, applying to the exposed surface of the pattern and parting a substance capable of accurately conforming to the shape and contour of the pattern and parting and solidifying under conditions which are not injurious to the surface of the master pattern to form a female impression of a portion of the master pattern, inverting said substance and master pattern, removing the parting material, applying to the exposed surface of the pattern a substance possessing characteristics similar to the characteristics of the first mentioned substance to form a female impression of the remainder of the master pattern, separating said female impressions, and applying to each a non-fusable material capable of filling said female impressions and solidifying therein under conditions which are not injurious to said female impressions to form production patterns.

9. The method of making patterns for casting irregular shaped articles having no well defined straight parting line which comprises applying to a wood model of said article a parting material to eliminate back draft, positioning locating means outside of the parting material, applying to the exposed surface of the wood model an alloy having such low pouring temperature as to not injure the exposed surface of the wood model to form a block having said locating means reproduced therein and having a female impression of a portion of the wood model, inverting said block and model and applying to the surface of the wood model initially covered by the parting material an alloy having such low pouring temperature as to not injure the exposed surface of wood model or fuse with the first mentioned alloy to form a female impression of another portion of the wood model and having said locating means reproduced therein, separating said female impressions and applying to each a substance having the characteristics of filling said female impressions and solidifying to form blocks having said locating means reproduced therein and having male patterns accurately conforming to the shape and contour of the wood model.

10. The method of making production patterns from a master wood pattern which comprises applying parting material to the master pattern to eliminate back draft, positioning spaced locator pins outside of the master pattern and parting material, applying to the exposed surface of the master wood pattern and parting a substance capable of solidifying under conditions which are not injurious to the surface of the master model to form a female impression of a portion of the master pattern having locator holes therein, inverting said material and master pattern, removing the parting, applying to the exposed surface of the master pattern and exposed surface of the originally applied substance a second substance capable of solidifying under conditions which are not injurious to the surface of the master model to form a female impression of the remainder of the master pattern having locators thereon, separating said female impressions, applying to each a substance capable of solidifying under non-fusing conditions with said female impressions to form blocks having cooperating locating means and production patterns formed thereon, and machining the vertical edges of said blocks to facilitate alignment of said production patterns in the flask of a mold.

11. The method of forming stripper-plate production patterns from a master pattern comprising applying parting material to the master pattern to eliminate back draft, forming impressions of the parted and unparted portions of the master pattern and parting material, applying stripper plates to said impressions, and forming production patterns from the impressions and stripper plates.

12. The method of forming production patterns from a master pattern comprising positioning the master pattern on a supporting surface, applying parting material to eliminate back draft on the master pattern, applying to the exposed surface of the master pattern and parting material a substance capable of being applied in a liquid state and solidifying under conditions not injurious to the master pattern to form an impression of the pattern member and parting material, removing the parting material and forming an impression of the initially-parted portion of the pattern and the contour of the parting material in a substance capable of being applied in a liquid state and solidifying without injuring the master pattern, separating said impressions and applying to each a nonfusible substance capable of filling said impressions to provide production patterns.

RAYMOND J. MILLER.